United States Patent
Silvus et al.

(10) Patent No.: US 7,134,068 B2
(45) Date of Patent: Nov. 7, 2006

(54) CHANNEL PROCESSING DATA WITHOUT LEADING SYNC MARK

(75) Inventors: Gregory L. Silvus, Boulder, CO (US); Ewe Chye Tan, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 331 days.

(21) Appl. No.: 10/638,910

(22) Filed: Dec. 4, 2003

(65) Prior Publication Data

US 2005/0138498 A1  Jun. 23, 2005

(51) Int. Cl.
*G06F 11/00* (2006.01)
*H04L 7/00* (2006.01)

(52) U.S. Cl. ............... 714/798; 714/788; 714/701; 375/357

(58) Field of Classification Search ............. 714/32, 714/795, 798, 701, 799; 375/357, 368
See application file for complete search history.

(56) References Cited

U.S. PATENT DOCUMENTS

| | | | |
|---|---|---|---|
| 4,333,177 A * | 6/1982 | Sutterlin ............... 714/32 |
| 4,419,701 A * | 12/1983 | Harrison et al. ......... 360/77.08 |
| 4,525,840 A | 6/1985 | Heinz |
| 5,231,545 A | 7/1993 | Gold |
| 5,255,131 A | 10/1993 | Coker |
| 5,260,976 A | 11/1993 | Dilivo |
| 5,365,382 A | 11/1994 | Weng |
| 5,400,369 A * | 3/1995 | Ikemura ............... 375/368 |
| 5,424,881 A | 6/1995 | Behrens |
| 5,588,030 A | 12/1996 | Riggle |
| 5,729,396 A | 3/1998 | Dudley |
| 5,737,371 A * | 4/1998 | Jaquette ............... 375/357 |
| 5,854,717 A | 12/1998 | Minuhin |
| 5,909,331 A | 6/1999 | Behrens |
| 6,023,386 A | 2/2000 | Reed |
| 6,061,779 A * | 5/2000 | Garde ............... 712/204 |
| 6,108,152 A | 8/2000 | Du |
| 6,125,469 A | 9/2000 | Zook |
| 6,332,010 B1 | 12/2001 | Lee |
| 6,408,421 B1 * | 6/2002 | Benes et al. ............ 714/795 |
| 6,411,452 B1 * | 6/2002 | Cloke ............... 360/51 |
| 6,473,369 B1 | 10/2002 | Quan |
| 6,509,851 B1 | 1/2003 | Clark |
| 2004/0015749 A1 * | 1/2004 | Ziegler et al. ........... 714/701 |

FOREIGN PATENT DOCUMENTS

EP      0341852 B1      1/1998

* cited by examiner

*Primary Examiner*—Albert Decady
*Assistant Examiner*—Fritz Alphonse
(74) *Attorney, Agent, or Firm*—Westman, Champlin & Kelly, P.A.

(57) ABSTRACT

An apparatus and a method of aligning data bits serially received at a channel input. A number of data bits including a first data bit are stored in a buffer that has a first buffer bit and a buffer size greater than the number of data bits. The data bits in the buffer are shifted to improve alignment of the first data bit and the first buffer bit. The shifted data bits are tested for alignment. If the testing of the data bits indicates correct alignment, then the aligned data bits are transmitted from the buffer to a host for use. If the testing of the data bits indicates misalignment, then the data bits are passed to an error handling process.

24 Claims, 15 Drawing Sheets

CHANNEL PROCESSING DATA WITHOUT LEADING SYNC MARK

FIELD OF THE INVENTION

The present invention relates generally to communication channels, and more particularly but not by limitation to read channels in disc drives.

BACKGROUND OF THE INVENTION

In disc drives, a recording media sector typically includes a preamble (a 2T data pattern), a leading sync mark, host data, EDC (Error Detecting Code), ECC (Error Correcting Coding), and flush bits. The data is coded so that it maintains certain properties necessary for the proper operation of a readback channel. The flush bits written to the media force the channel to continue processing data until the final coded host data makes it through the circuitry. This function is commonly referred to as "flushing the channel." The leading sync mark, data coding, and flush bits affect the format efficiency of the drive. Format efficiency is the ratio of the number of original host data symbols to the number of data symbols actually written to the disc. As a rule of thumb in contemporary products, a 1% improvement in format efficiency translates to about 0.18 dB improvement in signal-to-noise ratio (SNR), a significant improvement in a read channel. The use of a data format in which a leading sync mark must be substantially correct in order for data to be read, reduces the format efficiency and also increases the number of errors that must be either handled or mapped out of the drive by a flaw scan procedure.

A method and apparatus are needed that can increase format efficiency by reducing or eliminating the need to read a leading sync mark in a data channel. Embodiments of the present invention provide solutions to these and other problems, and offer other advantages over the prior art.

SUMMARY OF THE INVENTION

Disclosed are an apparatus and a method of aligning data bits serially received at a channel input. A number of data bits including a first data bit are stored in a buffer that has a first buffer bit and a buffer size greater than the number of data bits. The data bits in the buffer are shifted to improve alignment of the first data bit and the first buffer bit. The shifted data bits are tested for alignment. If the testing of the data bits indicates correct alignment, then the aligned data bits are transmitted from the buffer to a host for use. If the testing of the data bits indicates misalignment, then the data bits are passed to an error handling process.

Other features and benefits that characterize embodiments of the present invention will be apparent upon reading the following detailed description and review of the associated drawings.

DETAILED DESCRIPTION OF ILLUSTRATIVE EMBODIMENTS

Disclosed is a communication channel and method that allow data that includes error detection and correction coding (EDC and ECC) to be stored in a buffer and then shifted in the buffer to align the data without the required use of a usable leading sync mark. Format efficiency is improved. The arrangement can be accomplished in a variety of ways such as allowing reading of data when a sync mark is corrupted, by using a trailing sync mark that replaces some flush bits, or by providing no sync mark at all and using error detection and correction coding to align the data in a buffer before passing it on to a host system.

Figure 1:
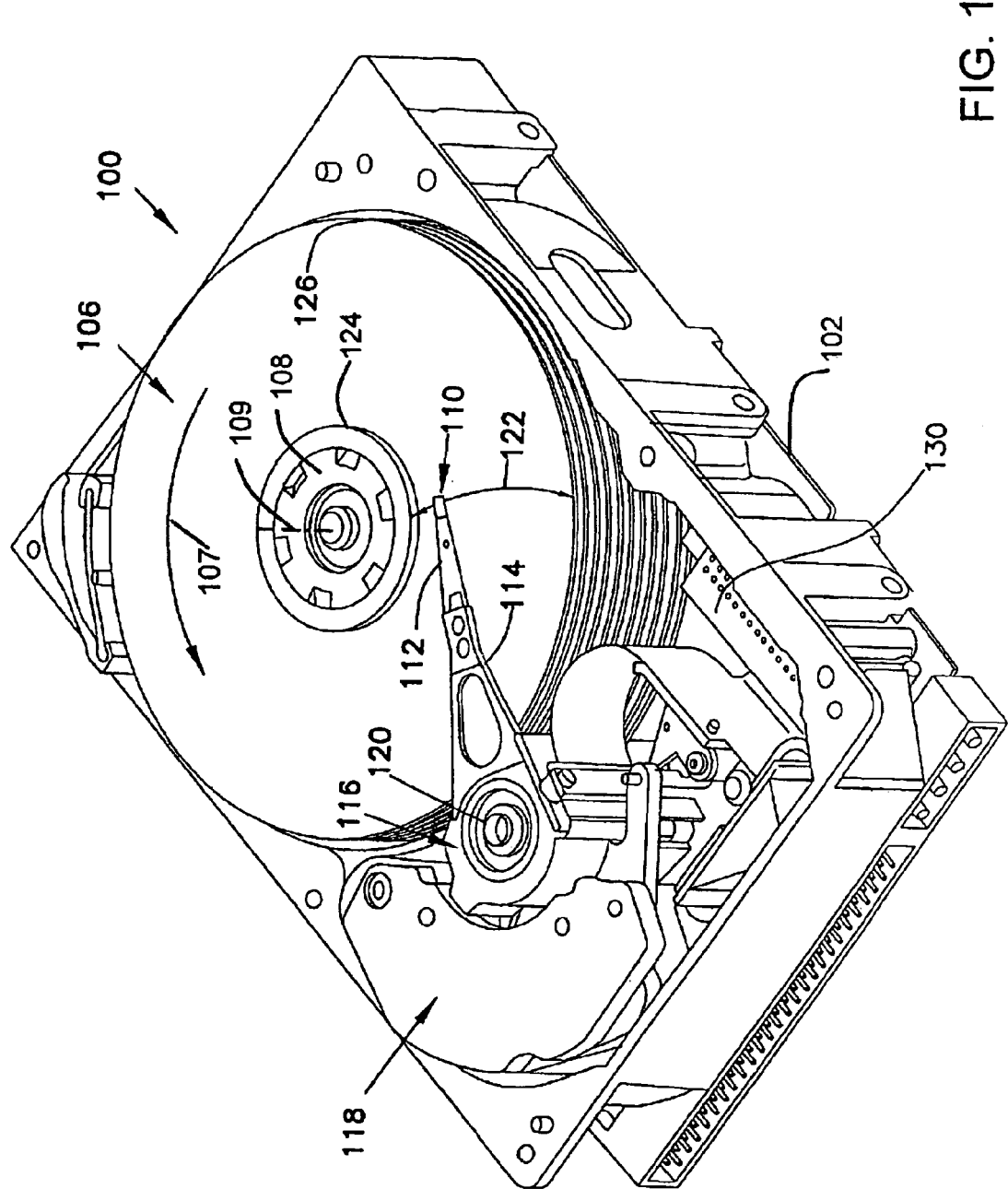
FIG. 1 is an oblique view of a disc drive.

FIG. 1 illustrates an oblique view of a disc drive 100 in which embodiments of the present invention are useful for adjusting a read channel. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown).

Figure 2:
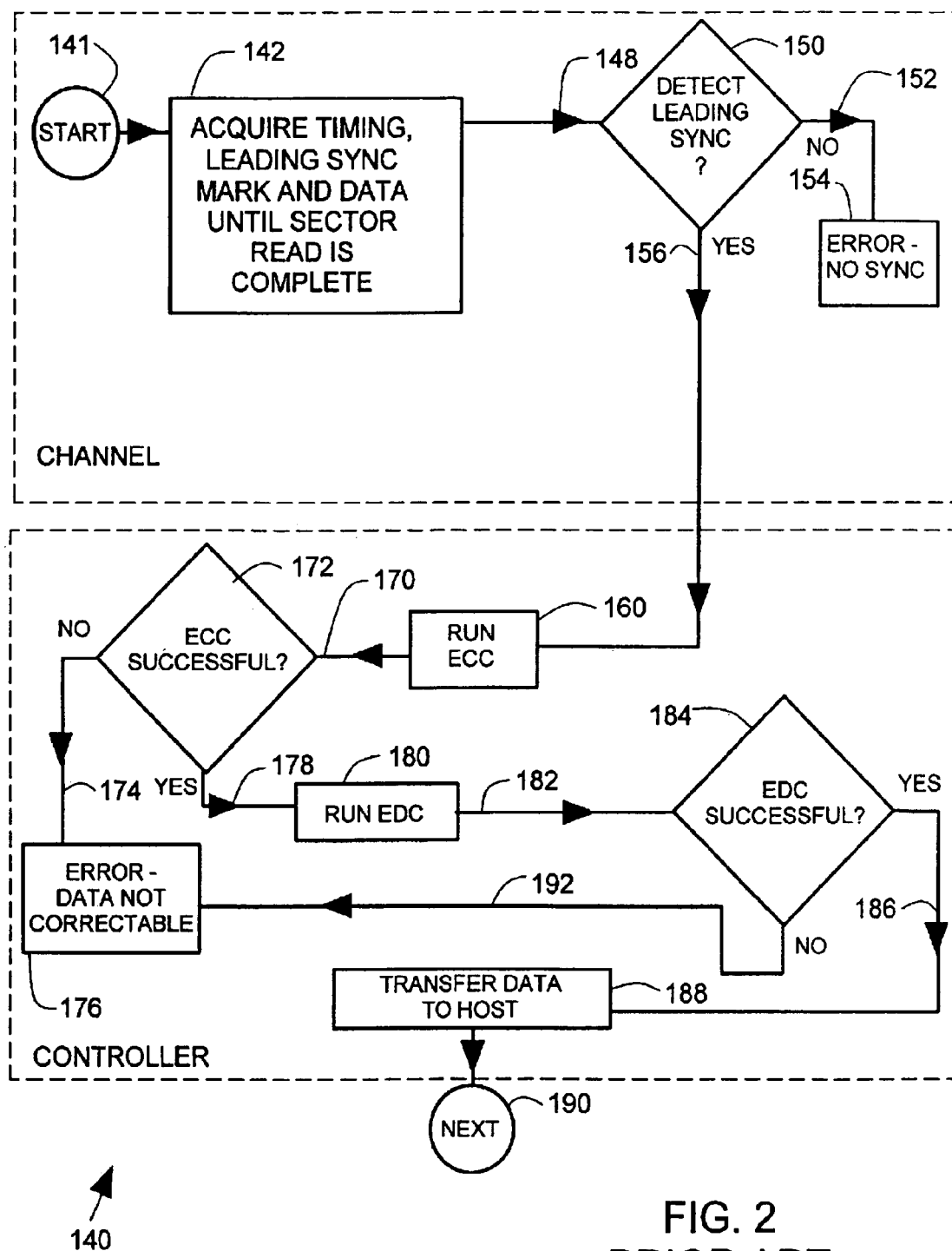
FIG. 2 illustrates a PRIOR ART read process.

FIG. 2 illustrates a PRIOR ART read process 140 in a read/write channel of a data storage device. Processing begins at start 141. Next, timing of the incoming read signal is acquired at process block 142. An example of an incoming read signal is described below in connection with FIG. 3. After timing is acquired and the reading of data is complete, program flow moves along line 148 to decision block 150. Decision block 150 detects whether a usable leading sync mark is present following a preamble. A leading sync mark is typically a non-code word with a high autocorrelation at only one time instant. A typical leading sync mark ranges in size from 27–60 bits. If a leading sync mark is not detected, then program flow continues from decision block 150 along line 152 to an error handling routine 154. If error handling routine 154 is accessed, then the time spent passing through processes 142 to 150 is completely lost due to a corrupted sync mark and a second attempt must be made to read the data.

If a usable leading sync mark is detected at decision block 150, then program flow continues along line 156 to a process 160. The data includes host data and error detecting and correcting data. Process 160 uses error correcting code (ECC) to test and correct the host data, and then program flow continues along line 170 to decision block 172. If the host data is found to be free of errors at decision block 172, then program flow continues from decision block 172 along line 178 to a process 180. Process 180 uses error detecting code (EDC) to test the host data, and then program flow continues along line 182 to decision block 184. If the host data is found to be free of errors at decision block 184, then program flow continues from decision block 184 along line 186 to a process 188 that transfers the host data to a host processor. After process 188 is complete, then the program flow moves to the next data operation at 190.

If the host data is found to have one or more errors at decision block 172, then program flow continues along line 174 to an error handling routine 176. If the host data is found to have any errors at decision block 184 then program flow continues along line 192 the error handling routine 176.

Figure 3:
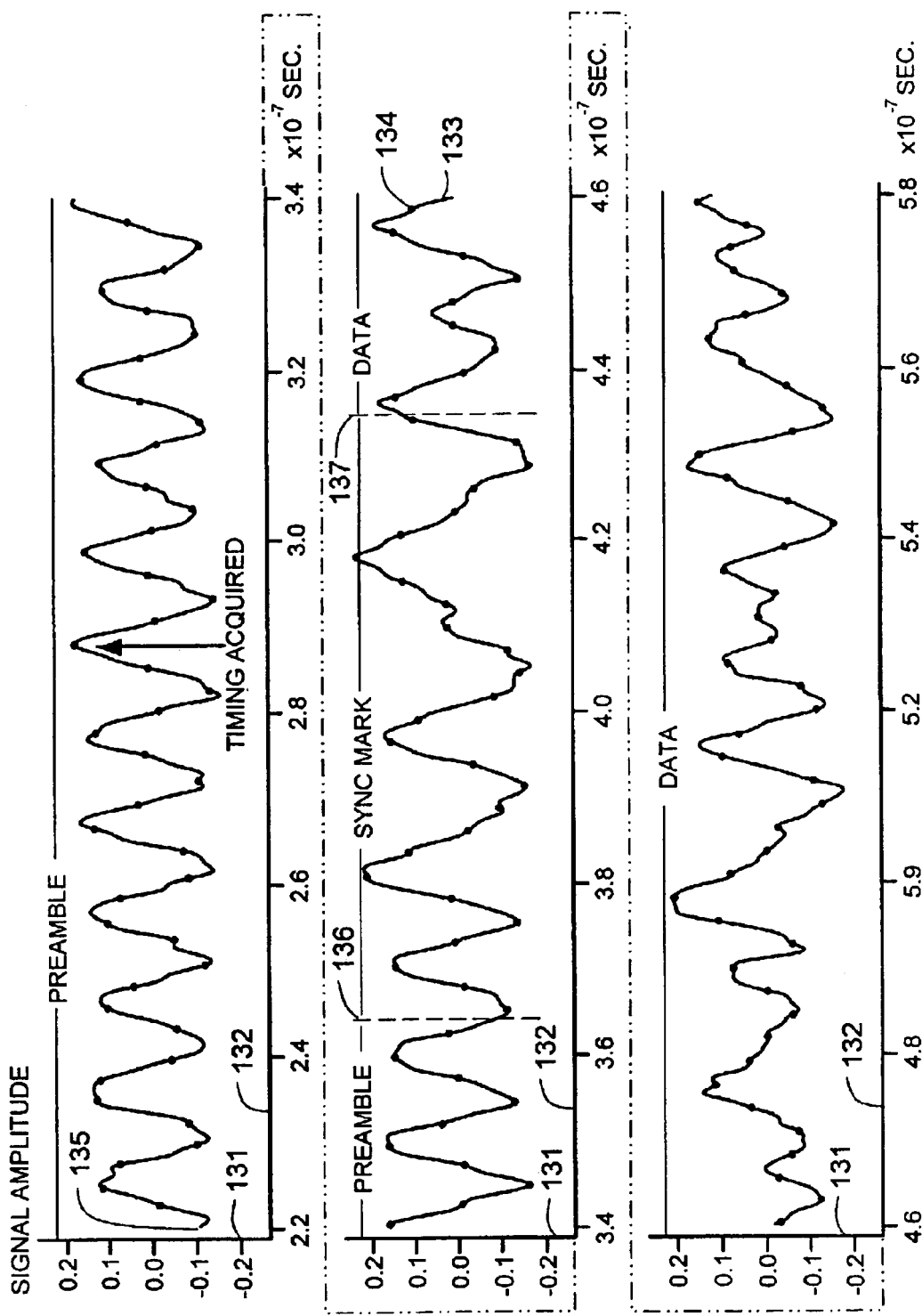
FIG. 3 illustrates a timing diagram of a typical preamble, leading sync mark and host data stream.

FIG. 3 schematically illustrates a timing diagram of a typical preamble, leading sync mark and host data stream as received in a read signal from a read head. The timing diagram in FIG. 3 is divided into three sequential segments in order to fit the illustration on a page. In FIG. 3, a vertical axis 131 represents amplitude and a horizontal axis 132 represents time. An analog read signal waveform 133 is illustrated by a solid line. A clock marker of a synchronizable read channel oscillator is present at multiple solid dots 134 that are superimposed on the waveform 133. The multiple solid dots 134 represent synchronous digital sampling of the analog read signal waveform 133. At the start 135 of the timing diagram, it can be seen that the clock markers (dots) are not aligned with the top and bottom peaks of the waveform 133 which is a preamble. As time elapses, the read channel oscillator adjusts its operation to finally synchronize the read channel oscillator with the waveform at a point marked "timing acquired." After the timing acquired point, the read channel oscillator stays synchronized (locked) to the waveform. The preamble ends at time 136 and a leading sync mark is received. For the sake of an example that will fit on a page, the sync mark is shown very short, however, it will be understood by those skilled in the art that sync marks in the range of 27–60 bits are preferred. The leading sync mark is a non-code word that tells the read channel to tell the controller that the data starts precisely at a data start time 137. As long as the leading sync mark can be read adequately, then the data can be read starting with the first bit and has a high probability of passing an error correcting code (ECC) test and an error detection code (EDC) test. If the leading sync mark is absent, or if the leading sync mark is so badly corrupted by noise that it can not be read correctly, then the read channel will not be able to tell the controller to assume the data starts at the correct point in time 137, and an error will result such as failing EDC and ECC tests. The problem with errors due to a missing leading sync mark or a corrupted leading sync mark are solved as described below in connection with FIGS. 4–12.

Figure 4:
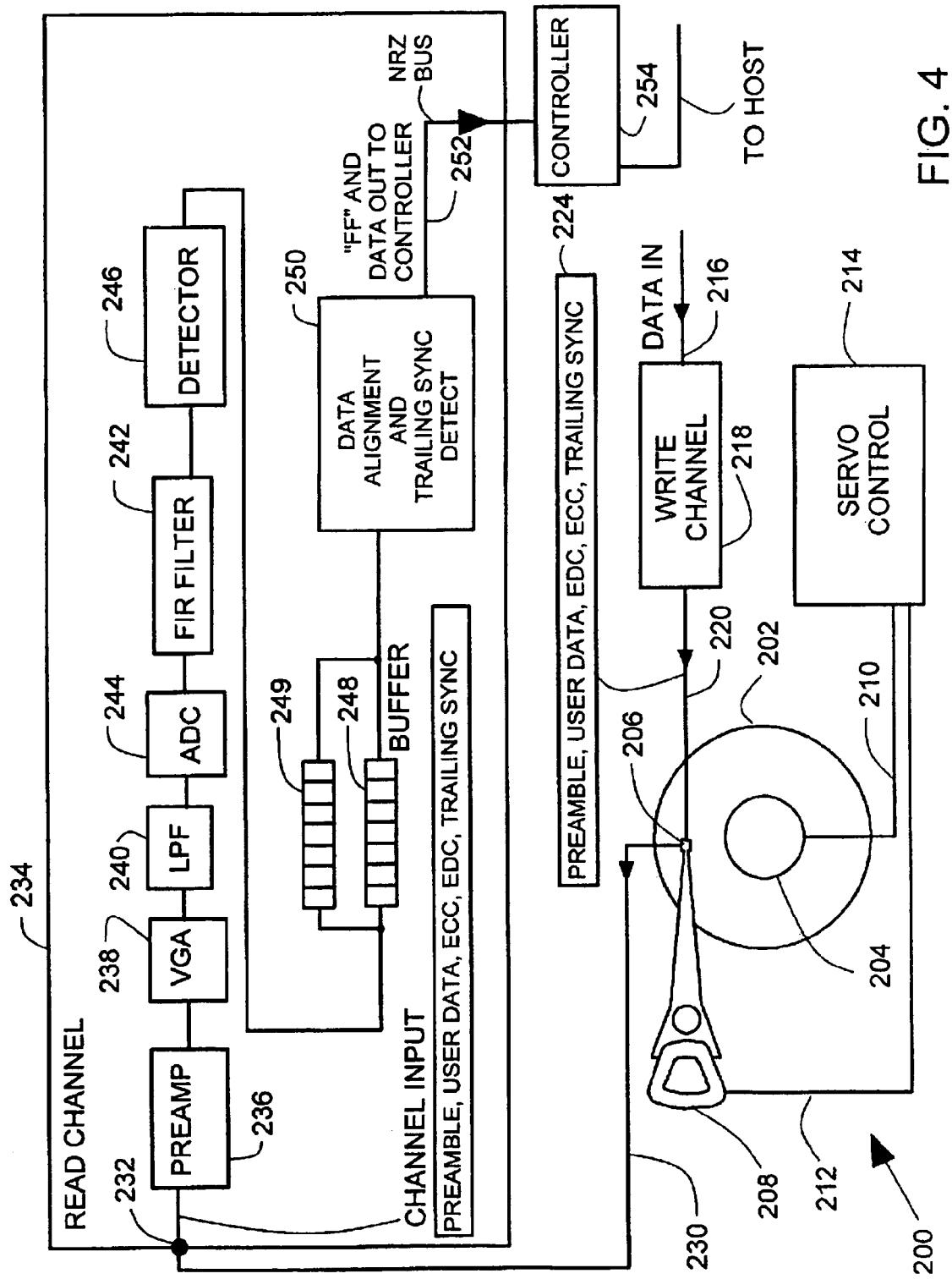
FIG. 4 illustrates a block diagram of a first disc drive that includes data alignment.

FIG. 4 schematically illustrates a block diagram of a first disc drive 200 that includes data alignment. Disc drive 200 includes a disc 202 that is spun by a disc drive motor 204. Data bits on the disc 202 are accessed by a read/write head 206. The read/write head 206 is positioned by a voice coil motor 208. The disc drive motor 204 and the voice coil motor 208 are controlled along lines 210, 212 by a servo controller 214. Data bits that are to be recorded are received from a host system such as a computer (not illustrated) on line 216. A write channel 218 receives the data bits from line 216 and provides the data, suitably formatted for writing on the disc 202, on line 220 to a write portion of the read/write head 206. The formatted data on line 220 includes formatting as illustrated at 224 in FIG. 4. The formatted data on line 220 includes a preamble, but does not include a leading sync mark. Instead, the preamble is followed immediately by host data, error detecting code, error correcting code and then a trailing sync mark.

When data bits are read from the disc 202, the read/write head 206 reads the data bits and couples them along line 230 to a read channel input 232 of a read channel 234. The read channel can take many forms, but typically includes (but is not limited to) cascaded stages of a preamplifier 236, a variable gain amplifier 238, a low pass filter 240, a FIR filter 242, an analog to digital converter 244 and a detector 246. The detector 246 provides the data bits in digital form to buffers 248, 249 which store the data bits. The buffers 248, 249 are controlled by a data alignment processor 250 which performs a data alignment process on the data. After the data alignment process is complete, host data is output to a host processor (not illustrated) along line 252. The host processor is included in the controller 254. The detector 246 is typically a viterbi detector. A transition from analog processing to digital processing takes place in the analog to digital converter 244. Depending on the design of the channel 234, the analog to digital converter 244 may be placed earlier or later in the cascaded stages 236–246. Two buffers 248, 249 are typically provided in order that one buffer can be filling with a stream of incoming data while data in the other buffer is being aligned.

In FIG. 4, the controller 254 preferably has a long-latency interface. A long-latency interface is one that can handle processing data for a longer period of time than normally required to process data from a single revolution of a disc. The long latency interface can handle data from multiple disc revolutions. Data is written with a preamble, data, EDC symbols, ECC symbols, and finally a trailing sync mark. The data is read by the drive and stored in the buffer 248, 249 where the position of the trailing sync mark is ascertained. Once the trailing sync mark is found, the channel 234 sends an "FF" to the controller (the standard signal to prepare the controller 254 to receive data), and then the data follows on line 252. The sync mark starts the flush process and can be detected at the output of the detector 246 or earlier, rather than on line 252 at the host processor. In one preferred arrangement, the sync mark accomplishes the entire job of flushing the detector 246, and about three bytes are removed from the data stream saving 0.5% in format efficiency or almost 0.10 dB in SNR when applied to contemporary disc drive systems.

Figure 5:
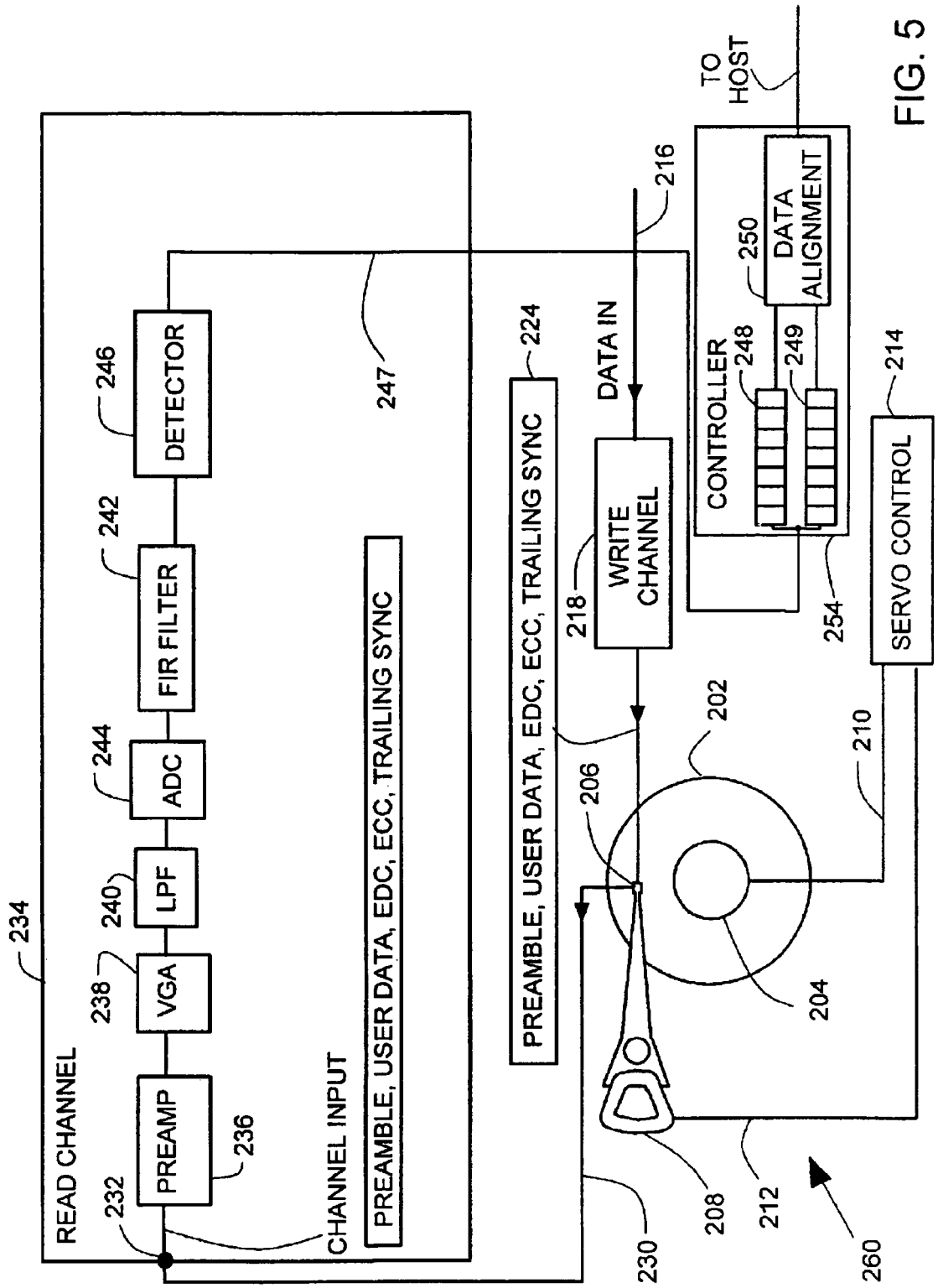
FIG. 5 illustrates a block diagram of a second disc drive that includes data alignment.

FIG. 5 illustrates a block diagram of a second disc drive 260 that includes data alignment. The disc drive 260 illustrated in FIG. 5 is similar to the disc drive 200 illustrated in FIG. 4. Reference numbers used in FIG. 5 that are the same as reference numbers used in FIG. 4 identify the same or similar features. The buffers 248, 249 and data alignment processor 250 are part of the read channel 234 in disc drive 200. In disc drive 260, however, the buffers 248, 249 and the data alignment processor 250 are part of the controller 254. In other respects, the disc drives 200 and 260 are similar to one another. It will be understood by those skilled in the art that the buffers 248, 249 and data alignment processor 250 can be used in various types of communication channels and their use is not limited to use with read channels. The function of the data processor 250 and buffers 248, 249 are described in more detail below by way of an example illustrated in FIGS. 6A–6B.

In FIG. 5, the read channel 234 sends detected read data, including preamble to the disc drive controller 254. The controller 254 then parses the data stream to locate the end of preamble and the trailing sync mark. The controller has access to the length of the data record. In FIG. 5, the read channel 234 sends data in a steady stream to the controller 254. The controller 254 buffers this data in buffers 248, 249, finds the end of the preamble and the sync mark, making sure that the number of bits between the two accounts for the correct number of symbols expected in the record. If the sector is split between two wedges, the controller has access to the number of symbols in the split and it receives a trailing sync mark at the end of each part of the data record. A wedge typically includes data that is stored in a pie slice shaped portion of a disc between servo fields. A wedge may include one or more sectors of a disc.

Figure 6A:
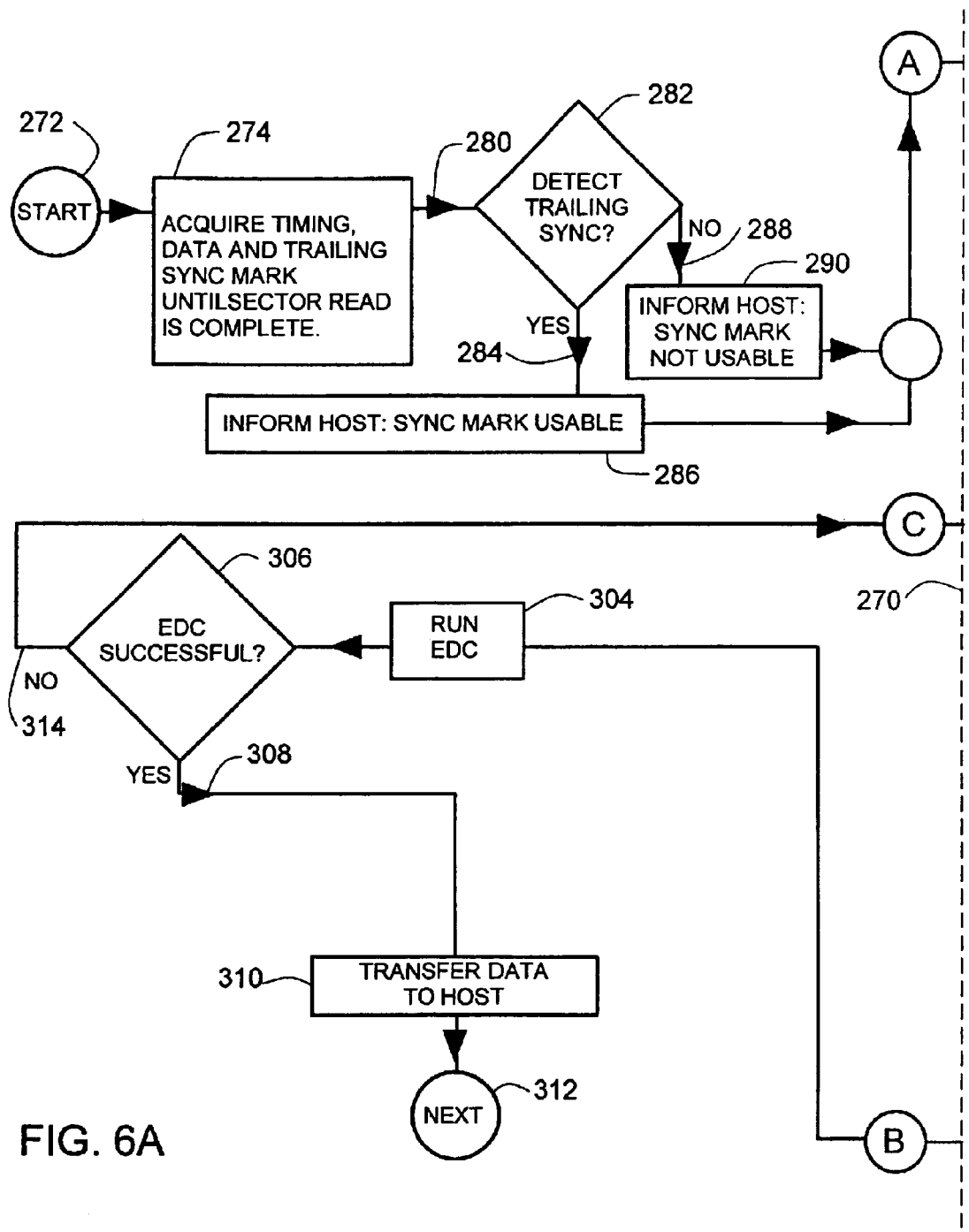
FIGS. 6A–6B illustrate a flow chart of a read process that includes data alignment.
Figure 6B:
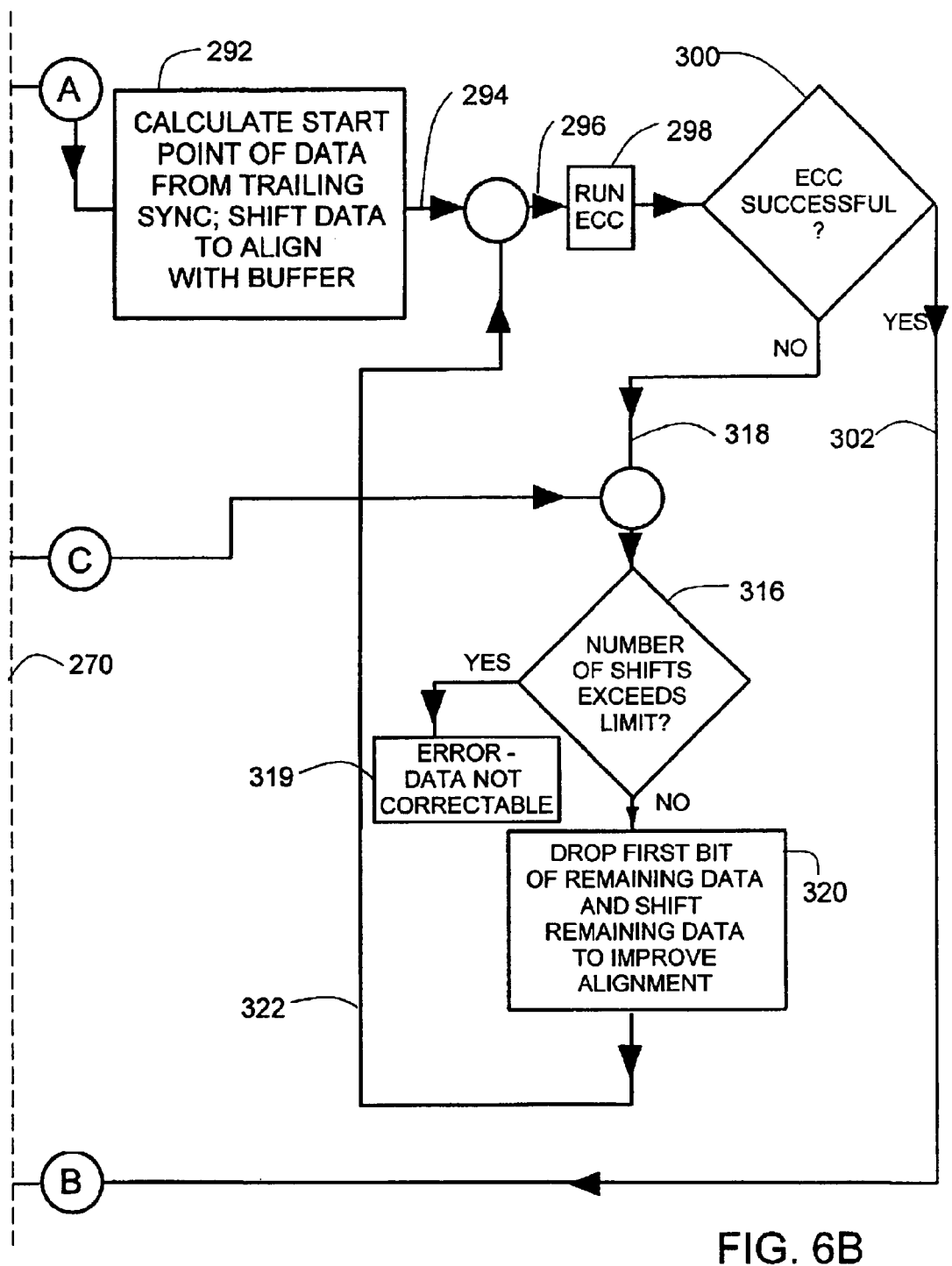

FIGS. 6A–6B, taken together, schematically illustrate a flow chart of a read process that includes data alignment using a trailing sync mark. FIGS. 6A–6B are best understood when joined together along a dashed line 270 that appears in both FIG. 6A and FIG. 6B. Lines of program flow that extend between FIGS. 6A and 6B are further identified by transfer bubbles A, B and C which appear in both FIGS. 6A, 6B.

Program flow begins at START 272. Next at 274, the read channel acquires timing, data (including EDC and ECC), and a trailing sync mark. Then program flow continues along line 280 to a decision block 282. At decision block 282, the incoming data stream is tested to find whether or not a usable trailing sync mark is detected. If a usable trailing sync mark is detected at decision block 282, then program flow continues from decision block 282 along line 284 to process 286 which transmits a message to the host that the sync mark is usable. If a usable trailing sync mark is not detected at decision block 282, then program flow continues along line 288 to process 290 which transmits a message to the host that the sync mark is not usable. After completion of either process 286 or 290, program flow continues by way of transfer bubble A to process 292.

At process 292, a start point of the data is calculated based on the position of the trailing sync mark and the known length of the data. Also at process 292, the data is shifted so that the data is aligned in a buffer. After completion of process 292, program flow continues along lines 294, 296 to process 298. At process 298, an error correction code (ECC) test is run. After completion of the test at process 298, program flow continues to decision block 300. If the ECC test is found unsuccessful at decision block 300, then program flow continues along line 318 to decision block 316. If the ECC test is successful, then program flow continues from decision block 300 along line 302 by way of transfer bubble B to process 304.

At process 304, an error detection code (EDC) test is run. After completion of the test at process 304, program flow continues to decision block 306. If the EDC test is successful, then program flow continues along line 308 to process 310. Process 310 transfers host data (without EDC and ECC data) to the host and program flow continues to the next operation at 312. If the EDC test is found unsuccessful at decision block 306, then program flow continues along line 314 by way of transfer bubble C to decision block 316.

At decision block 316, which can be reached by either an EDC or ECC failure, if a number of previous data shifts exceeds a preselected number of shifts, the data is treated as non-correctable in process 319. If the number of previous data shifts does not exceed the preselected number, then program flow continues to process 320.

At process 320, a first bit of the data remaining (after any previous passes through process 320) is dropped and the remaining data is shifted one bit in an effort to improve the data alignment. After completion of process 320, program flow continues along lines 322 and 296 back to the process 298. When data is found to have errors, an effort is made to better align the data by shifting the data (as many times as needed up to the preselected number) to correct for any possible misalignment which may have occurred in process 292 due to a corrupted sync mark.

Figure 7:
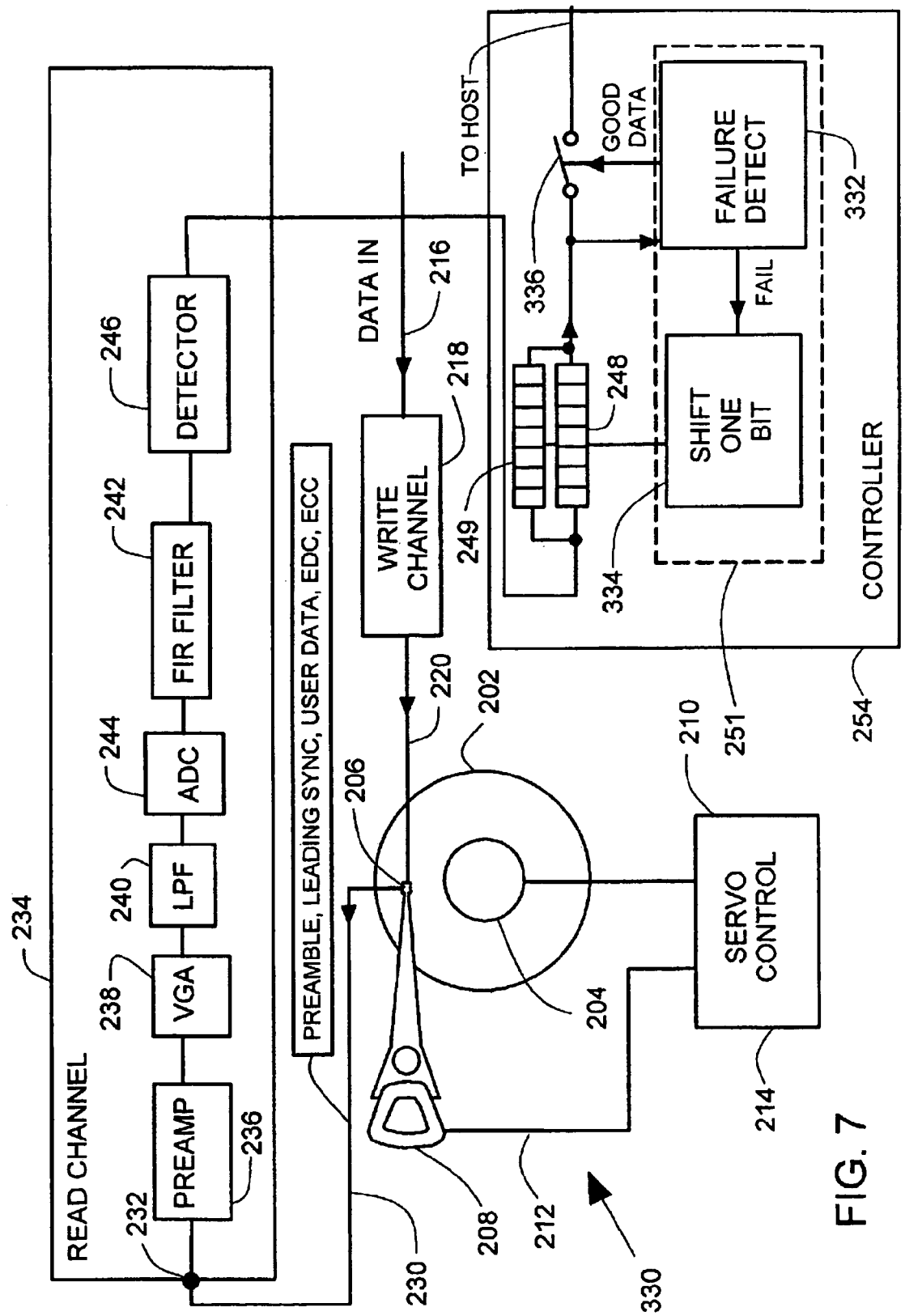
FIG. 7 illustrates a block diagram of a third disc drive that includes data alignment.

FIG. 7 illustrates a block diagram of a third disc drive that includes data alignment using data that has a leading sync mark that may be corrupted so that it is unusable. The disc drive 330 illustrated in FIG. 7 is similar to the disc drive 200 illustrated in FIG. 4. Reference numbers used in FIG. 7 that are the same as reference numbers used in FIG. 4 identify the same or similar features. In FIG. 4, the buffers 248, 249 and data alignment processor 250 are part of the read channel 234 in disc drive 200. In disc drive 330 of FIG. 7, however, the buffers 248, 249 and a data alignment processor 251 are part of a controller 254. In FIG. 7, data includes a leading sync (rather than the trailing sync of FIG. 4) as described below in an example illustrated in FIG. 8. In FIG. 7, the data alignment processor 251 includes a failure detection circuit 332 that detects errors in the data bits in the buffers 248, 249. If no EDC or ECC errors are found by the failure detection circuit 332, then the host data in the buffer is passed to the host system. If there are errors found by the failure detection circuit 332, then the failure detection circuit controls circuit 334 to shift data in the buffer 248 by one bit at a time until the data is correctly aligned in the buffer. This arrangement allows the read circuit to recover from a corrupted leading sync mark as explained in more detail by way of an example described below in connection with FIGS. 9A–9B. In other respects, the disc drives 200 and 330 are similar to one another.

It will be understood by those skilled in the art that the buffers 248, 249 and data alignment processor 251 can be used in various types of communication channels and their use is not limited to use with read channels. The function of the data processor 251 and buffers 248, 249 of FIG. 7 are described in more detail below by way of the example illustrated in FIGS. 9A–9B.

Figure 8:
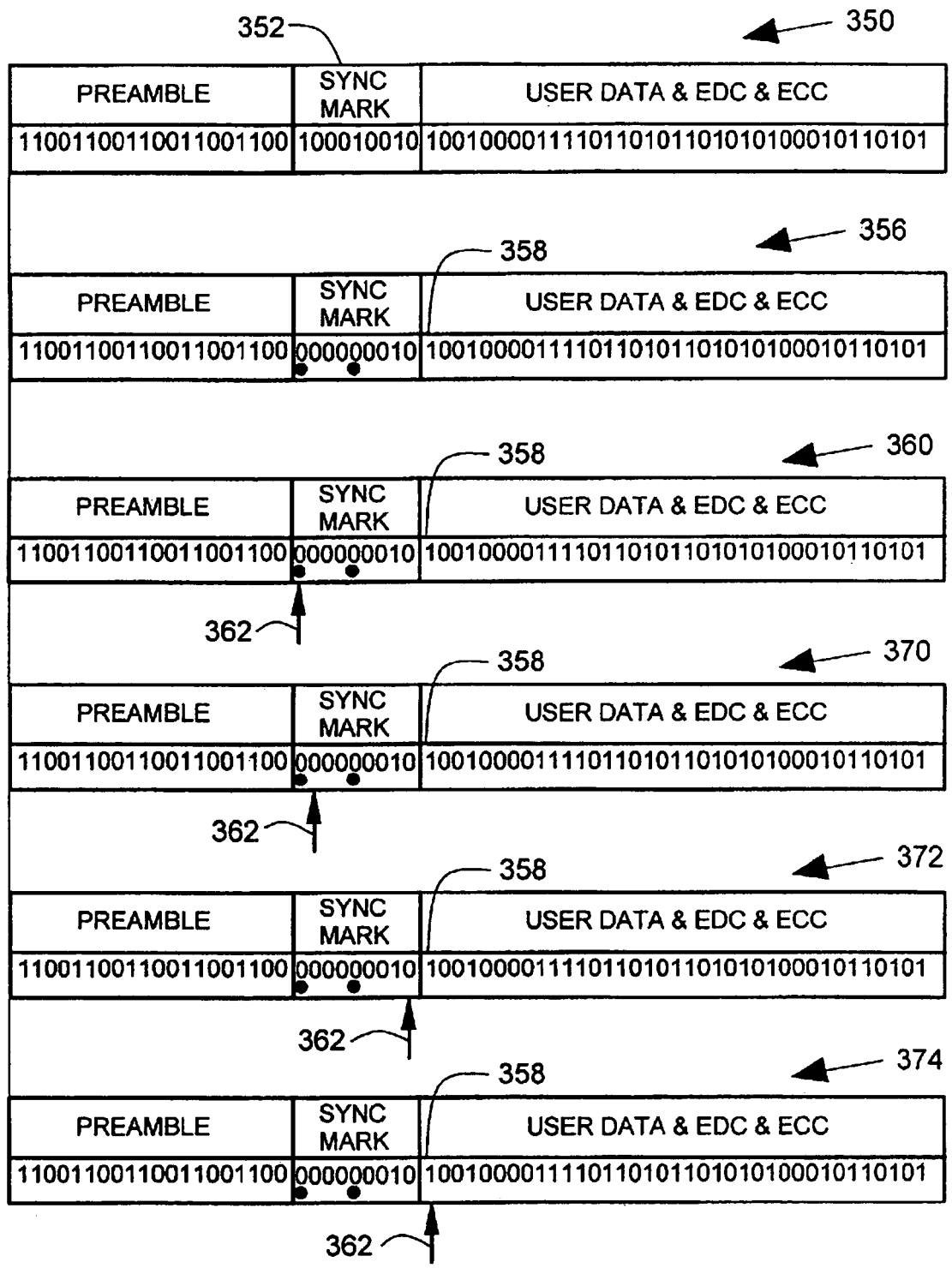
FIG. 8 illustrates processing of a data pattern.

FIG. 8 illustrates examples of data patterns (numbers of data bits) that can be processed by the arrangement in FIG. 7. In FIG. 8, a number of data bits with an uncorrupted sync mark is illustrated at 350. The sync mark 352 is this example is 100010010. It will be understood by those skilled in the art that sync marks in the range of 27–60 bits are preferred, and that the sync mark illustrated is kept short so that it will fit on a page for purposes of illustration. When the data at 350 passes through the disc drive controller 254 in FIG. 7, no errors are detected by failure detection circuit 332 and the good data is passed to the host via switch 336. A number of data bits with a corrupted sync mark are illustrated at 356. The bits at 356 that are corrupted are marked with solid dots. When the data at 356 is tested by the failure detection circuit 332, it is found to have errors. The data at 356 is found to have errors because there is no identifiable sync mark to accurately indicate the start of host data at first bit 358. As illustrated at 360, the first bit 358 of the data is not aligned with a first bit 362 (indicated by an arrow) of the buffer 248. The alignment circuit 251 in FIG. 7 repeatedly shifts the alignment of the first data bit 362, one bit at a time, as indicated at intermediate steps 370, 372, 374 until the first bit 358 of the data and the first bit 362 of the buffer are aligned with one another as shown at 374. When this correct alignment takes place, the error detecting code (EDC) and error correcting code (ECC) in the host data will indicate no errors and then the good (properly aligned) data is passed to the host via switch 336.

In FIGS. 7–8, data is recorded with a leading sync mark, but the data can be read even if the sync mark is corrupted. On readback, if the leading sync mark is not detected, a retry sequence is begun. The controller hardware is arranged to retain the read back bits in a buffer. The data in the buffer 248 is tested for a 2T pattern (the preamble). At the point where the 2T pattern stops, the controller will try to correct the data in the buffer using the ECC (Error Correction Coding) parity symbols. If it cannot correct the data, the data in the buffer is shifted by one bit (ignoring the previous first bit, and using the next bit as the new first bit). This procedure continues until the data in the buffer is correctable. After the data are corrected, the EDC (Error Detection Coding) symbols test the integrity of the data. The controller 254 retains the readback bits in the buffer 248 and determines where the 2T pattern ends as before. The controller requests the data from the channel and attempts to correct the data. If the controller fails, it will shift the data stored in its buffer and try again. Once the controller succeeds, it proceeds as usual by testing the EDC symbols as before. If the controller fails to correct the data after a pre-specified number of attempts, the data is lost, and the user is no worse off than if the retries had not been utilized. When this technique is used, it relaxes the burden to scan for flaws stringently. If it is not used, then a careful search must be made for defects in the area where sync marks fall. The arrangement allows use of sectors with flaws where the sync mark falls. Previously, an entire sector could not be used, because the failed sync mark would invalidate the ability to search the rest of the data field for defects. With this method, smarter firmware could be written that allows sectors to be shifted around a little to work around small defects that at one time would have fallen under the sync mark.

The new controller design shifts data into the buffer one bit at a time rather than one symbol at a time. The readback channel 234 preferably includes a buffer internal to the channel. A flag would tell the channel to retain a particular sector (or it would retain the sector automatically if it failed to find the sync mark). Another trigger tells the channel to send the data again shifted by one bit.

In FIG. 8 at 374, the data is correctable by the ECC unless it contains more errors than the ECC is designed to handle. If it contains too many errors, it would have been unrecoverable anyway. If the data was correctable, the EDC symbols will also confirm the consistency of the data. This technique will also work if the preamble has corruption. It is easy to see that if the starting point at 360 were in the preamble section, incrementing the starting point would eventually lead to the starting point of the data and ECC. Knowing the length of the preamble and sync mark, and the approximate location of the sync mark in time limits the length of the search for the correct starting point. The sync mark location jitters with the write and read process. In implementing this solution, the first starting point is selected to be early enough that the start of the data is not missed.

Figure 9A:
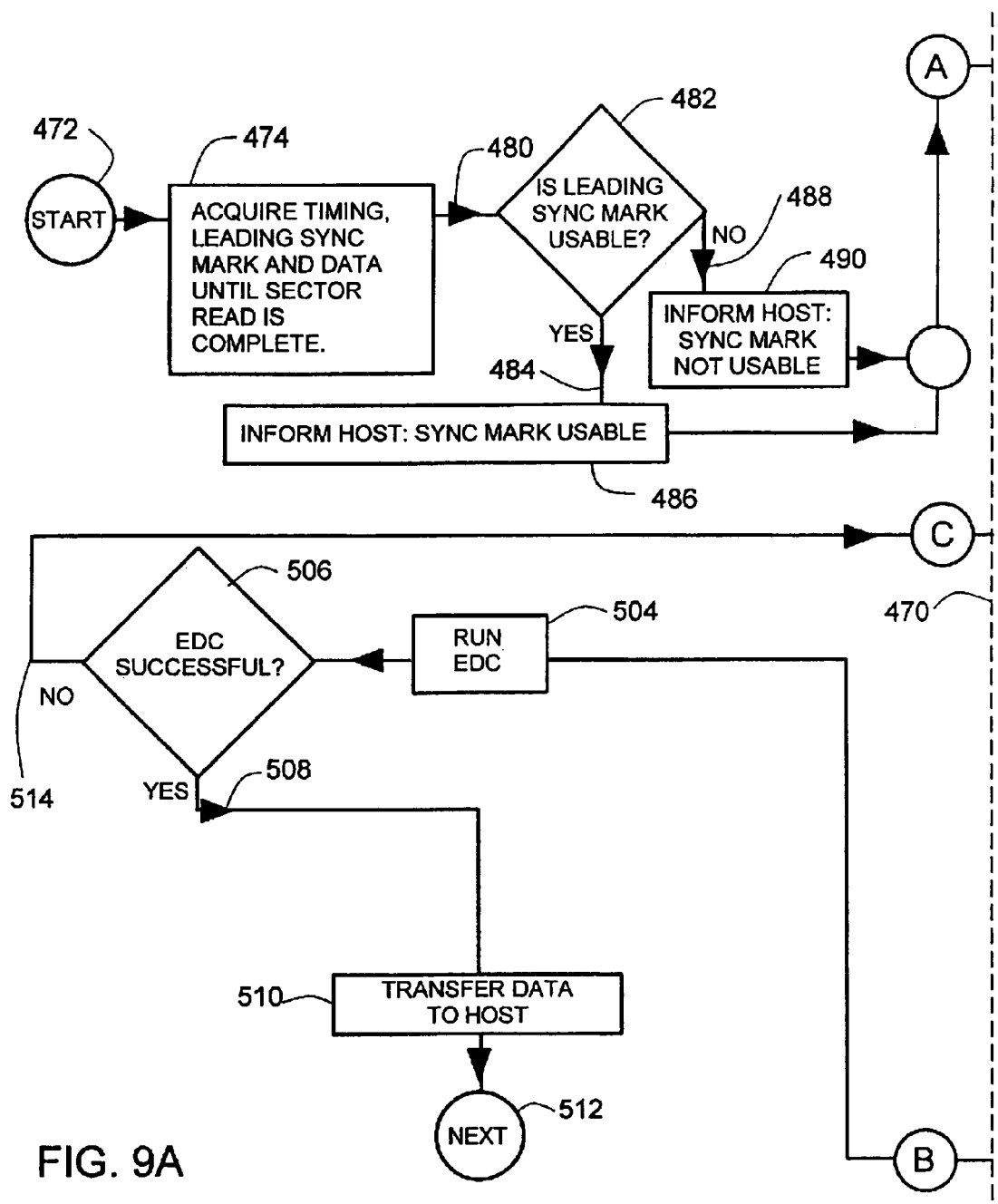
FIGS. 9A–9B illustrate a flow chart of a read process that includes data alignment.
Figure 9B:
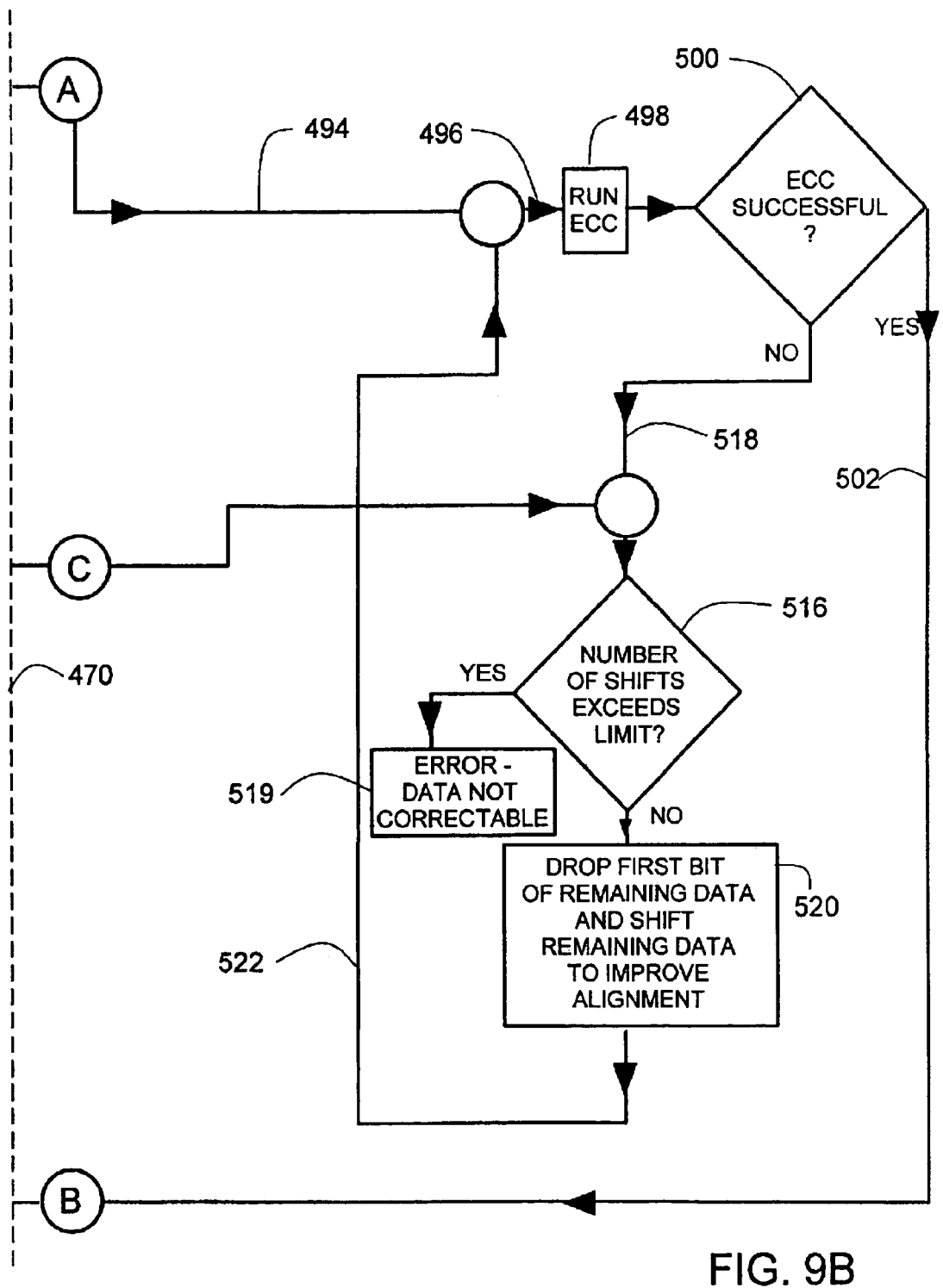

FIGS. 9A–9B, taken together, schematically illustrate a flow chart of a read process that includes data alignment using a leading sync mark, which can be corrupted as explained in FIG. 8. FIGS. 9A–9B are best understood when joined together along a dashed line 470 that appears in both FIG. 9A and FIG. 9B. Lines of program flow that extend between FIGS. 9A and 9B are further identified by transfer bubbles A, B and C which appear in both FIGS. 9A, 9B.

Program flow begins at START 472. Next at 474, the read channel acquires timing, a leading sync mark and data (including EDC and ECC). Then program flow continues along line 480 to a decision block 482. At decision block 482, the incoming data stream is tested to find whether or not a usable leading sync mark is detected. If a usable leading sync mark is detected at decision block 482, then program flow continues from decision block 482 along line 484 to process 486 which transmits a message to the host that the sync mark is usable. If a usable trailing sync mark is not detected at decision block 482, then program flow continues along line 488 to process 490 which transmits a message to the host that the sync mark is not usable. After completion of either process 486 or 490, program flow continues by way of transfer bubble A and lines 494, 496 to process 498.

At process 498, an error correction code (ECC) test is run. After completion of the test at process 498, program flow continues to decision block 500. If the ECC test is found unsuccessful at decision block 500, then program flow continues along line 518 to decision block 516. If the ECC test is successful, then program flow continues from decision block 500 along line 502 by way of transfer bubble B to process 504.

At process 504, an error detection code (EDC) test is run. After completion of the test at process 504, program flow continues to decision block 506. If the EDC test is successful, then program flow continues along line 508 to process 510. Process 510 transfers host data (without EDC and ECC data) to the host and program flow continues to the next operation at 512. If the EDC test is found unsuccessful at decision block 506, then program flow continues along line 514 by way of transfer bubble C to decision block 516.

At decision block 516, which can be reached by either an EDC or ECC failure, if a number of previous data shifts exceeds a preselected number of shifts, the data is treated as non-correctable in process 519. If the number of previous data shifts does not exceed the preselected number, then program flow continues to process 520.

At process 520, a first bit of the data remaining (after any previous passes through process 520) is dropped and the remaining data is shifted one bit in an effort to improve the data alignment. After completion of process 520, program flow continues along lines 522 and 496 back to the process 498. When data is found to have errors, an effort is made to better align the data by shifting the data (as many times as needed up to the preselected number) to correct for any possible misalignment which may have occurred in process 492 due to a corrupted sync mark.

Figure 10:
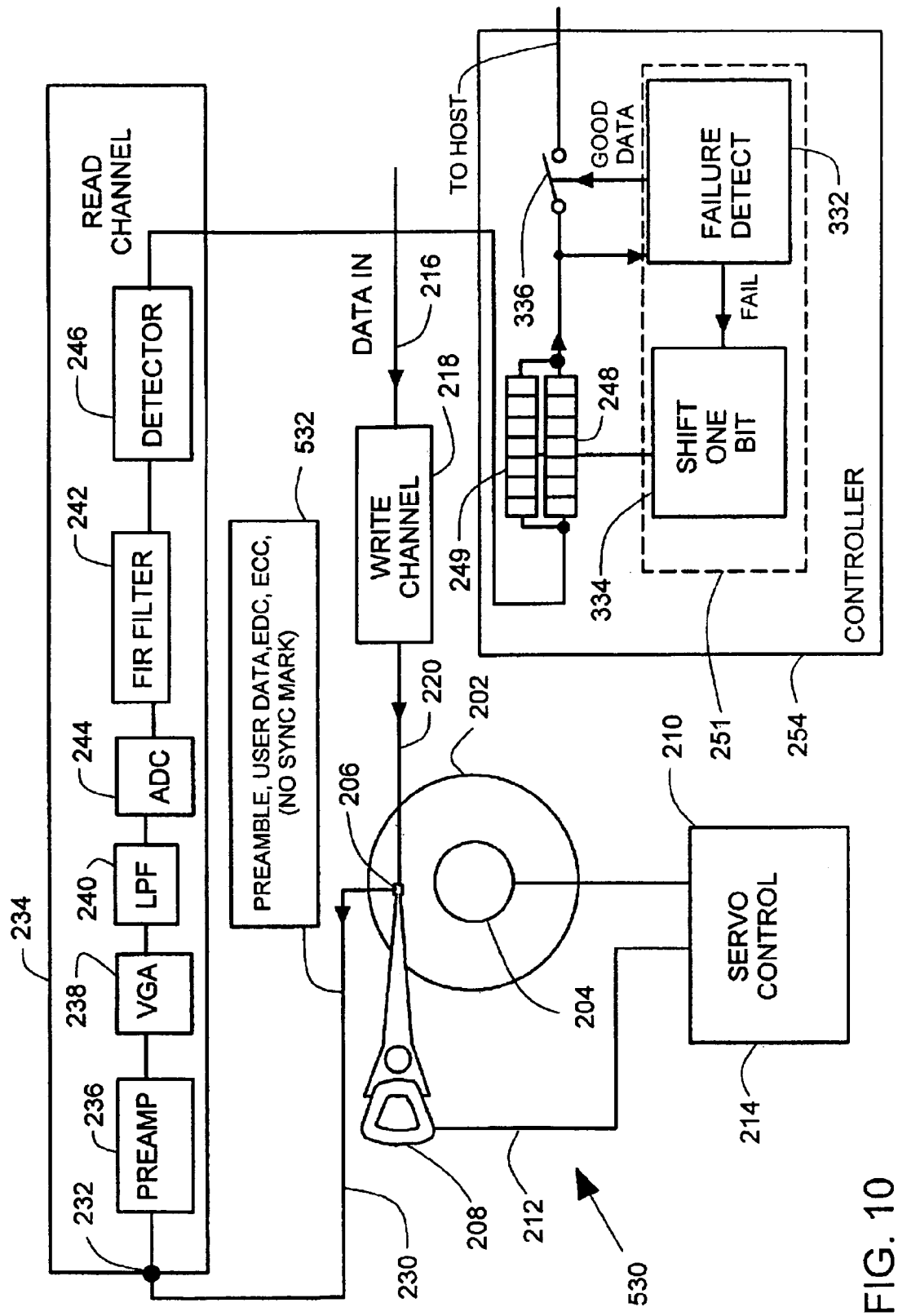
FIG. 10 illustrates a block diagram of a fourth disc drive that includes data alignment.

FIG. 10 illustrates a block diagram of a fourth disc drive that includes data alignment. The disc drive 530 illustrated in FIG. 10 is similar to the disc drive 330 illustrated in FIG. 7. Reference numbers used in FIG. 10 that are the same as reference numbers used in FIG. 7 identify the same or similar features. In FIG. 10, the data 532 that is written to and read from the disc 202 includes a preamble, host data, EDC and ECC. The data does not include either a leading sync mark or a trailing sync mark.

Figure 11:
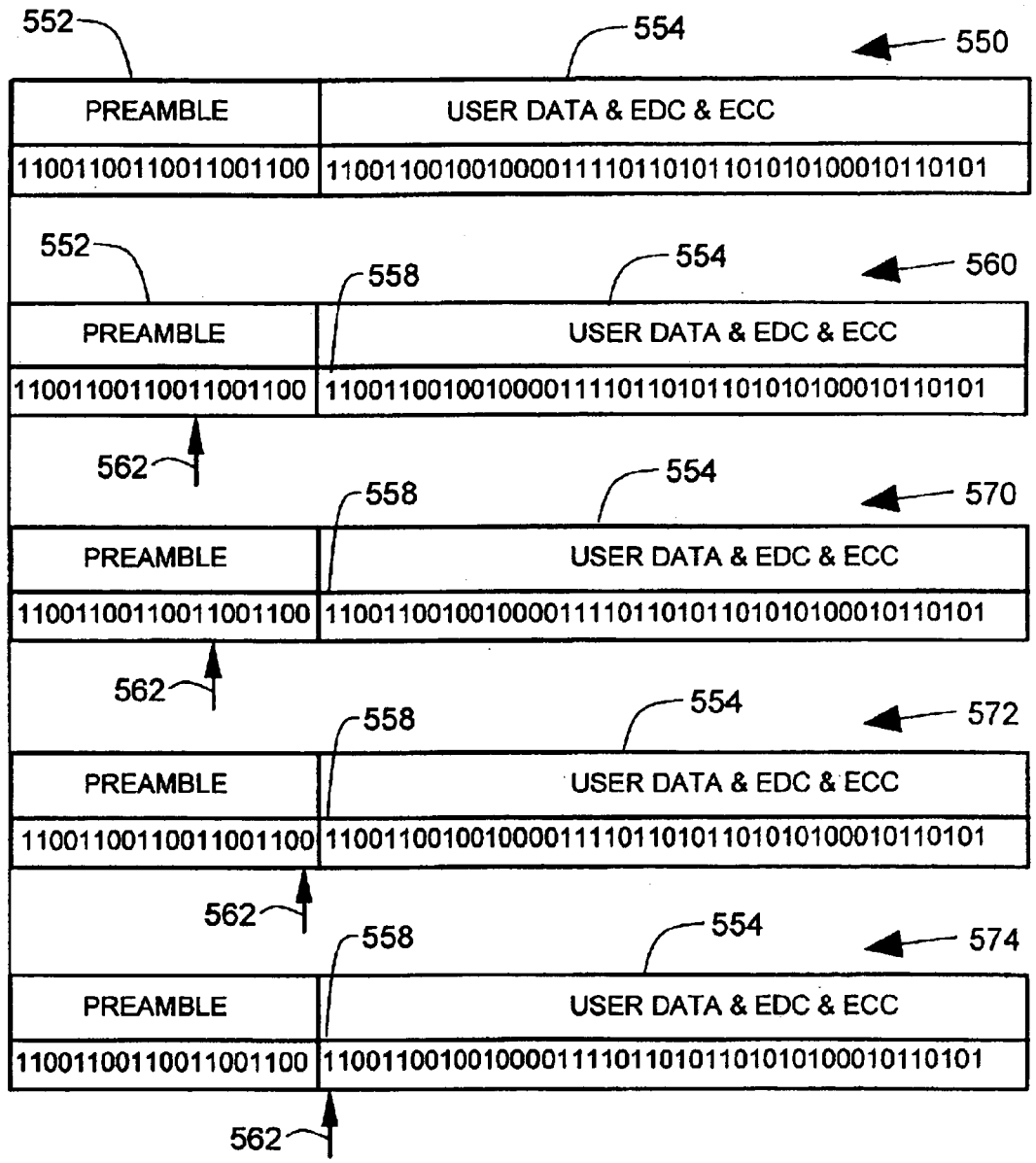
FIG. 11 illustrates processing a data pattern.

FIG. 11 illustrates an example of processing a data pattern in a disc drive such as disc drive 530 in FIG. 10. In FIG. 11, a number of data bits with no sync mark is illustrated at 550. The data bits include a preamble 552 and data 554 that includes host data, error detecting code and error correction code. For the sake of illustration, host data begins with a 2T sequence that, by itself, is indistinguishable from a 2T pattern in the preceding preamble 552. When the data at 550 passes through the disc drive controller 254 in FIG. 10 and it happens that the first bit of the data is aligned with the first bit of the buffer 248, no errors are detected by failure detection circuit 332 and the good data is passed to the host by switch 336. However, since there is no sync mark whatsoever, it is usually the case the buffer also includes a number of bits of the preamble. When the data at 550 is tested by the failure detection circuit 332, it may be found to have errors because it is misaligned with the buffer 248. As illustrated at 560, the first bit 558 of the data is not aligned with a first bit 562 (indicated by an arrow) of the buffer 248. The alignment circuit 251 repeatedly shifts the alignment of the first data bit 558, one bit at a time, as indicated at intermediate steps 570, 572, 574 until the first bit 558 of the data and the first bit 562 of the buffer are aligned with one another as illustrated at 574. When this correct alignment takes place, the error detecting code (EDC) in the host data will indicate no errors and then the good (properly aligned) data is passed to the host via switch 336 in FIG. 10.

The controller does not depend on an "FF" to signify the beginning of data, and the channel sends preamble along with data. "FF" is the standard signal to prepare the controller 254 to receive data. Data is written with a preamble, (no sync mark), data, EDC symbols, and ECC symbols. On readback the channel sends readback data, including some preamble to the controller. The controller then parses the data stream to locate the approximate point at which the preamble ends. The controller will try to correct the data in the buffer starting at the preamble end using the ECC (Error Correction Coding) parity symbols. If it cannot correct the data, the data in the buffer is shifted by one bit (ignoring the previous first bit, and using the next bit as the new first bit). This procedure continues until the data in the buffer is correctable. After the data are corrected, the EDC (Error Detection Coding) symbols test the integrity of the data. If the controller fails to correct the data after a pre-specified number of attempts (shifts), the data is lost because it contained too many errors, just as in today's standard operation.

The controller shifts data into the buffer one bit at a time rather than one symbol at a time. It also includes circuitry that allows it to search for preamble bits, and there is no dependency upon an "FF" symbol from the channel to mark the beginning of data. Similarly, the readback channel sends preamble bits in addition to data.

In FIG. 11 at 574, the data is correctable by the ECC unless it contains more errors than the ECC is designed to handle. If it contains too many errors, it would have been unrecoverable using the normal sync mark anyway. Note that the data may contain preamble-like sequences at the beginning of the record without degrading the efficacy of the algorithm. If the data was correctable, the EDC symbols will also confirm the consistency of the data. This technique will also work if the preamble has corruption. If the starting point at 560 is anywhere before the data, incrementing the starting point eventually leads to the starting point of the data and ECC. Knowing the length of the preamble limits the length of the search for the correct starting point. The location of the start of data sync mark jitters with the write and read process, in implementing this solution, the first starting point is selected early enough that the start of the data is not missed.

Figure 12A:
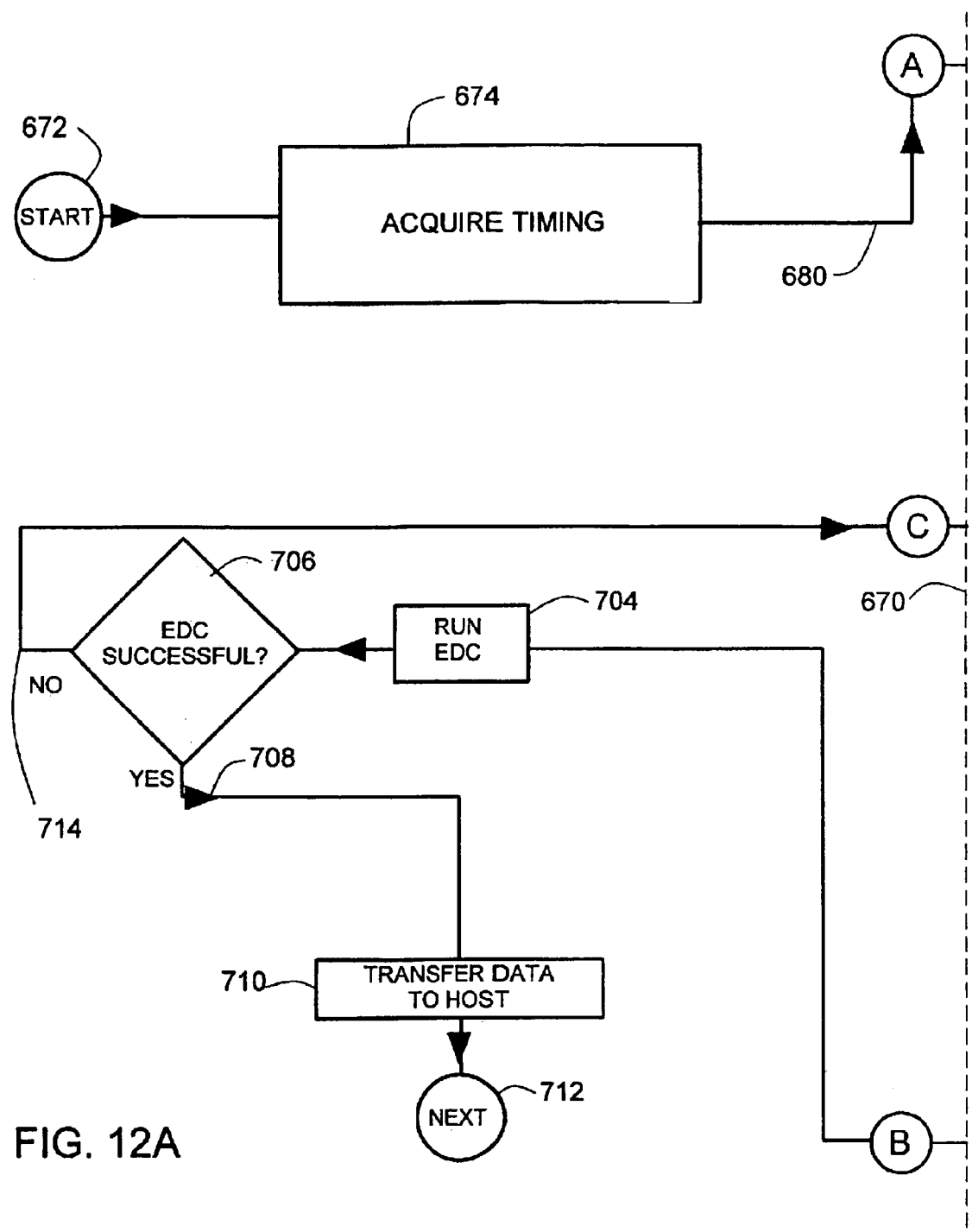
FIGS. 12A–12B illustrate a flow chart of a read process that includes data alignment.
Figure 12B:
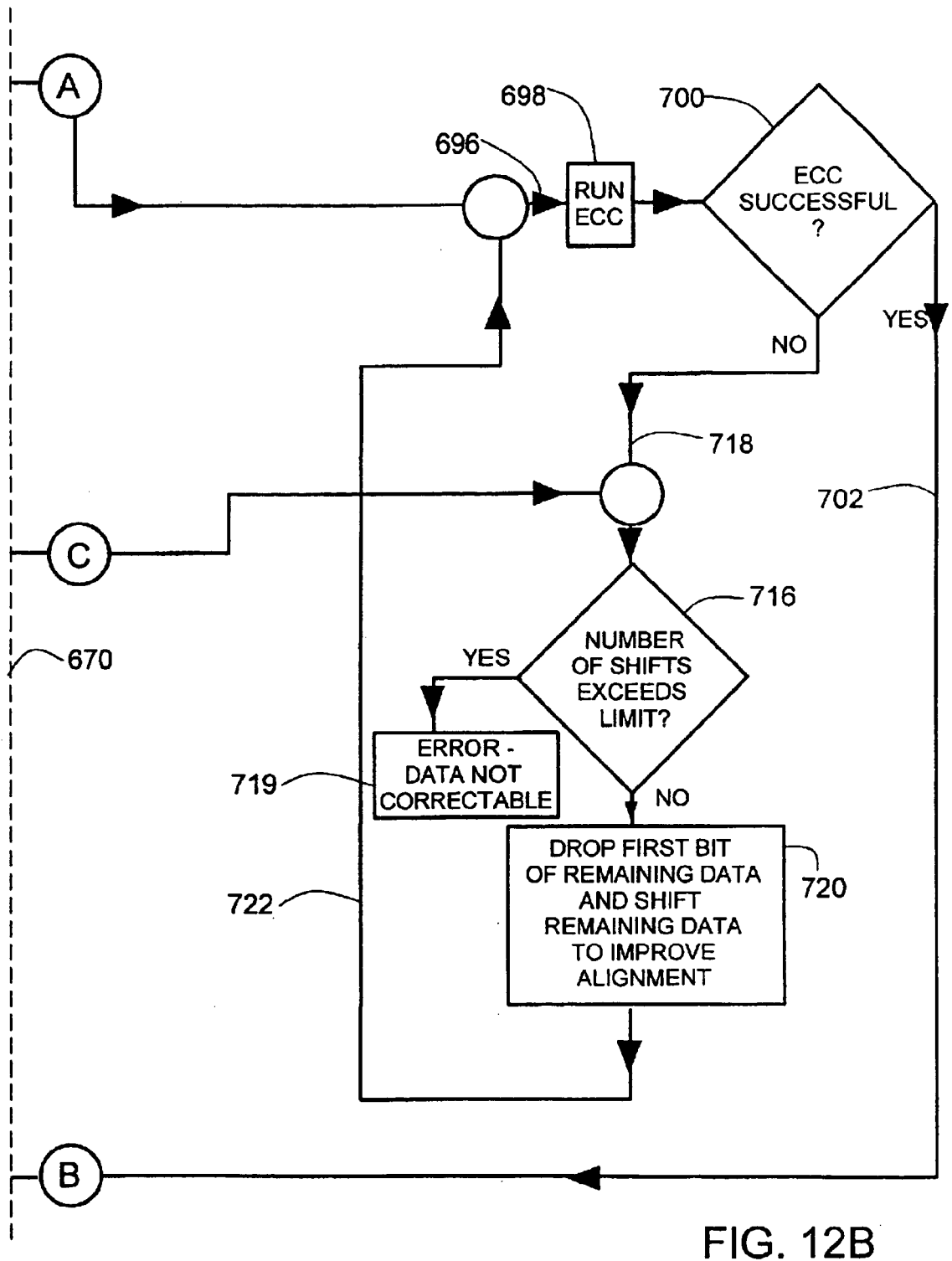

FIGS. 12A–12B, taken together, schematically illustrate a flow chart of a read process that includes data alignment without needing to use either a leading sync mark or a trailing sync mark. FIGS. 12A–12B are best understood when joined together along a dashed line 670 that appears in both FIG. 12A and FIG. 12B. Lines of program flow that extend between FIGS. 12A and 12B are further identified by transfer bubbles A, B and C which appear in both FIGS. 12A, 12B.

Program flow begins at START 672. Next at 674, the read channel acquires timing, a leading sync mark and data (including EDC and ECC). Then program flow continues along line 680, 696 to process 698.

At process 698, an error correction code (ECC) test is run. After completion of the test at process 698, program flow continues to decision block 700. If the ECC test is found unsuccessful at decision block 700, then program flow continues along line 718 to decision block 716. If the ECC test is successful, then program flow continues from decision block 700 along line 702 by way of transfer bubble B to process 704.

At process 704, an error detection code (EDC) test is run. After completion of the test at process 704, program flow continues to decision block 706. If the EDC test is successful, then program flow continues along line 708 to process 710. Process 710 transfers host data (without EDC and ECC data) to the host and program flow continues to the next operation at 712. If the EDC test is found unsuccessful at decision block 706, then program flow continues along line 714 by way of transfer bubble C to decision block 716.

At decision block 716, which can be reached by either an EDC or ECC failure, if a number of previous data shifts exceeds a preselected number of shifts, the data is treated as non-correctable in process 719. If the number of previous data shifts does not exceed the preselected number, then program flow continues to process 720.

At process 720, a first bit of the data remaining (after any previous passes through process 720) is dropped and the remaining data is shifted one bit in an effort to improve the data alignment. After completion of process 720, program flow continues along lines 722 and 696 back to the process 698. When data is found to have errors, an effort is made to better align the data by shifting the data (as many times as needed up to the preselected number) to align the data without the use of either a leading or trailing sync mark.

In summary, a method (such as illustrated in FIGS. 6A–6B, 9A–9B or 12A–12B) or apparatus (such as illustrated in FIGS. 4, 5, 7 or 10) align data bits (such as illustrated in FIG. 8 or 11) serially received at a channel input (such as 232). A number of data bits (such as 554) or including a first data bit (such as 358 or 558) are stored in a buffer (such as 248) that has a first buffer bit (such as 362 or 562) and a buffer size greater than the number of data bits. The data bits in the buffer are shifted to improve alignment of the first data bit and the first buffer bit. The shifted data bits are tested for alignment (such as at test block 306, 506 or 706). If the testing of the data bits indicates correct alignment, then the aligned data bits are transmitted (such as at process 312, 512 or 712) from the buffer to a host for use. If the testing of the data bits indicates misalignment, then the data bits are passed to an error handling process (such as processes at 320, 520, 720).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular data formats used for data storage while maintaining substantially the same functionality without departing from the scope and spirit of the present invention. In addition, although the preferred embodiment described herein is directed to a read channel for a disc drive system, it will be appreciated by those skilled in the art that the teachings of the present invention can be applied to other communication channels, without departing from the scope and spirit of the present invention.

What is claimed is:

1. A method of aligning data bits serially received at a channel input, comprising:
   A, storing a number of the data bits including a first data bit in a buffer that has a first buffer bit location representing a start of data in the buffer and a buffer size greater than the number of data bits;
   B, shifting the data bits in the buffer to improve alignment of the first data bit and the first buffer bit location;
   C, testing the shifted data bits for alignment, then continuing to transmitting if the testing indicates alignment, and proceeding to an error handling process if the testing indicates misalignment; and
   D, transmitting the aligned data bits from the buffer to a host.

2. The method of claim 1 wherein the number of data bits comprises host data and error detection information, and the testing in C, comprises detecting an error in the host data using the error detection information.

3. The method of claim 2 wherein the error detection information comprises error detecting coding and error correction coding.

4. The method of claim 1 wherein the data bits comprise host data and a sync mark trailing the host data, and wherein the shifting process in B, comprises shifting the data a selected number of bits based on the alignment of the trailing sync mark with the buffer.

5. The method of claim 4 wherein the shifting in B, includes calculating the shift as a function of a count of the number of data bits.

6. The method of claim 4 wherein the channel input is a read channel input and the buffer and data alignment are disposed in a read channel of a data storage device.

7. The method of claim 4 wherein the channel input is a read channel input and the buffer and data alignment are disposed in a disc drive controller.

8. The method of claim 1 wherein the shifting in B, comprises shifting the data bits by a single bit shift, and the error handling in C, comprises returning to B.

9. The method of claim 8 further comprising testing for a sync mark after process A, and if a sync mark is found, skipping B, and C.

10. The method of claim 8 further comprising testing the host data for errors after each one bit shift.

11. The method of claim 8 wherein the serially received data bits include a sync mark and, if the sync mark is corrupted, performing C, and, if the sync mark is uncorrupted, skipping C, and continuing with D.

12. the method of claim 8 wherein the serially received data bits include no sync marks, and the alignment process is followed for all of the serially received data bits.

13. The method of claim 1 wherein the data bits comprise host data, and the testing in B comprises error checking the shifted data based on an error detecting code embedded in the host data.

14. A channel, comprising:
   a channel input adapted to receive a number of serial data bits including a first data bit;
   a buffer storing the number of the data bits, the buffer having a first buffer bit location representing a start of data in the buffer and a buffer size greater than the number of data bits;
   a data alignment circuit shifting the data bits in the buffer to improve alignment of the first data bit and the first buffer bit location; and
   a decision block testing the shifted data bits for alignment, and if the data bits are aligned, transmitting the aligned data bits from the buffer to a host, and if the data bits are not aligned, then executing an error handling process if the testing indicates misalignment.

15. The channel of claim 14 wherein the number of data bits comprises host data and error detection information, and the decision block detects an error in the host data using the error detection information.

16. The channel of claim 15 wherein the error detection information comprises error detecting coding and error correction coding.

17. The channel of claim 14 wherein the data bits comprise host data and a sync mark trailing the host data, and wherein the data alignment circuit shifts the data a selected number of bits based on the alignment of the trailing sync mark with the buffer.

18. The channel of claim 17 wherein the data alignment circuit calculates the shift as a function of a count of the number of data bits.

19. The channel of claim 17 wherein the channel input is a read channel input and the buffer and data alignment are disposed in a read channel of a data storage device.

20. The channel of claim 17 wherein the channel input is a read channel input and the buffer and data alignment are disposed in a disc drive controller.

21. The channel of claim 14 wherein the data alignment circuit shifts the data bits by a single bit shift, and the error handling process comprises an additional shift.

22. The channel of claim 21 further comprising a decision block testing for a sync mark and if a sync mark is found, providing a bypass of the data alignment circuit.

23. The channel of claim 21 further comprising testing the host data for errors after each one bit shift.

24. A channel, comprising:
   a channel input adapted to receive a number of serial data bits including a set of bits comprising user data and an error correction code, wherein one of the bits in the set represents a first data bit;
   a buffer storing the number of the data bits, the buffer having a first buffer bit location representing a start of data in the buffer and a buffer size greater than the number of data bits;
   a data alignment circuit, which shifts the data bits in the buffer to produce shifted data bits and improve alignment of the first data bit relative to the first buffer bit location; and
   a test circuit, which performs an error correction code (ECC) test on at least a portion of the shifted data in the buffer, and if the ECC test is successful, then transmits the shifted data bits from the buffer, and if the ECC test is unsuccessful, then signals the data alignment circuit to repeat shifting the data bits in the buffer.

* * * * *